(12) United States Patent
Kageyama et al.

(10) Patent No.: US 6,575,612 B2
(45) Date of Patent: Jun. 10, 2003

(54) VEHICLE LAMP FIXTURE

(75) Inventors: Hiroyuki Kageyama, Shizuoka (JP); Teruaki Inaba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/990,691

(22) Filed: Nov. 9, 2001

(65) Prior Publication Data

US 2002/0057578 A1 May 16, 2002

(30) Foreign Application Priority Data

Nov. 13, 2000 (JP) ........................................ 2000-344748

(51) Int. Cl.7 .............................................. F21V 29/00
(52) U.S. Cl. ........................ 362/544; 362/267; 362/310; 362/516
(58) Field of Search ................................. 362/267, 310, 362/544, 516

(56) References Cited

U.S. PATENT DOCUMENTS

| 4,654,760 | A | * | 3/1987 | Matheson et al. | 362/267 |
|---|---|---|---|---|---|
| 6,017,141 | A | * | 1/2000 | Sugiyama et al. | 362/310 |
| 6,089,731 | A | * | 7/2000 | Sugiyama et al. | 362/267 |
| 6,217,202 | B1 | | 4/2001 | Kageyama et al. | 32/516 |
| 6,402,356 | B2 | * | 6/2002 | Gotou | 362/241 |

* cited by examiner

Primary Examiner—Sandra O'Shea
Assistant Examiner—Guiyoung Lee
(74) Attorney, Agent, or Firm—Koda & Androlia (57) ABSTRACT

A vehicle lamp fixture comprising a reflector that is made of a thermoplastic resin and is covered with a light reflecting film on its surface and a lens that is made of a thermoplastic resin and is mounted on the reflector. The reflector has a welding leg portion which projects from the circumferential edge of the reflector, and the tip end of the reflector welding leg portion is formed with an inclined surface which is inclined with respect to a direction in which the lens is brought to make a contact with the reflector when welding is performed between the reflector and the lens.

8 Claims, 8 Drawing Sheets

VEHICLE LAMP FIXTURE

BACKGROUND OF THE INVENTION

1. Field of the Invention

The present invention relates to a vehicle lamp fixture used in, for instance, an automobile and more particularly to a vehicle lamp fixture in which a lens for transmitting and radiating light to the outside is fixed by welding to a reflector that reflects the light emitted from a light source.

2. Prior Art

Figure 7A:
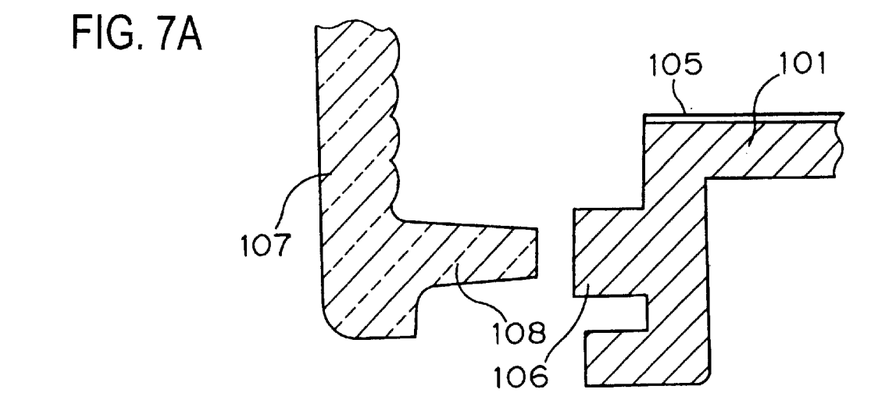
FIGS. 7A, 7B and 7C are schematic sectional views showing the welding steps of a lens and a lamp body taken in a conventional lamp fixture.
Figure 7B:
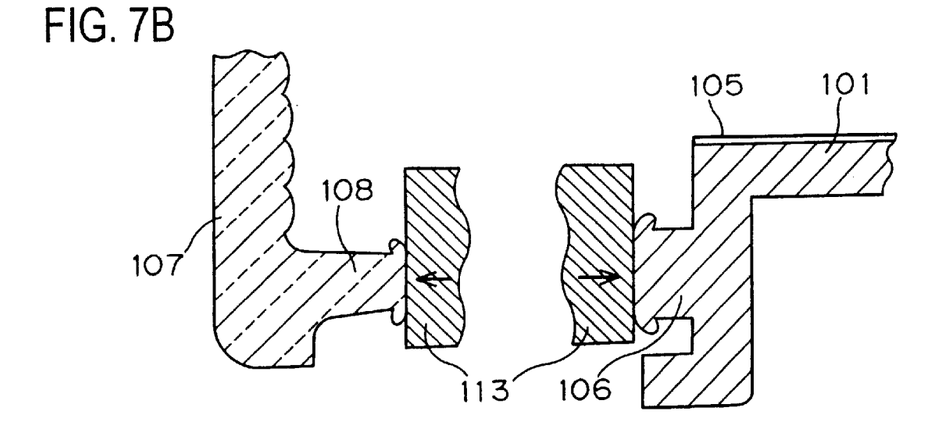
Figure 7C:
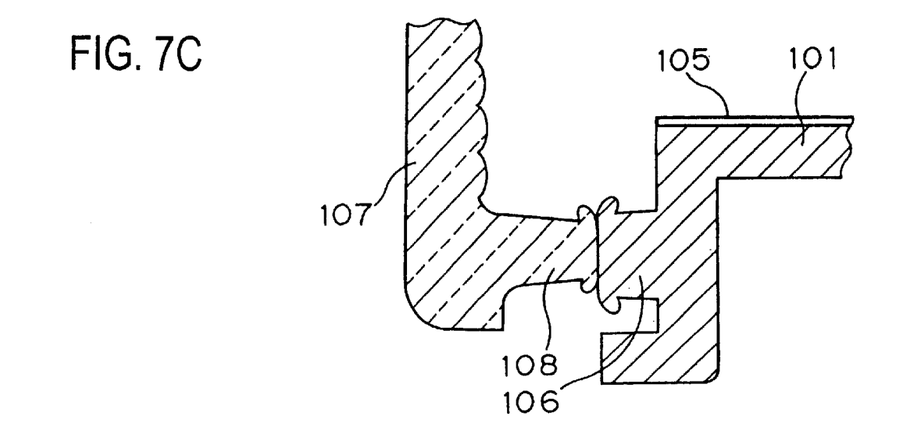

In a vehicle lamp fixture, a lens is mounted on the front opening of a lamp fixture body or a reflector that has a light reflecting surface (the term "reflector" used in the following description includes a lamp fixture body); and so as to simplify the lamp structure and improve the sealability of the lamp, the lens is heat welded to the reflector. FIGS. 7A through 7C show one example of the process of heat welding for a vehicle lamp fixture.

In FIG. 7A, a reflector 101 that is formed of a thermoplastic resin has a reflector welding leg portion 106 on its opening edge. The reflector welding leg portion 106 has a convex cross section so that it protrudes towards the front. Also, on an inner surface of the reflector 101, a light reflecting film 105 is formed by way of surface finishing. The light reflecting film 105 is formed by laminating, for example, an undercoat coating film, an aluminum vapor deposition film, and a top coat coating film. However, the light reflecting film 105 is not formed on a tip end surface of the reflector welding leg portion 106.

On the other hand, a lens 107 is made of a transparent thermoplastic resin, and a lens welding leg portion 108 having a convex cross section that protrudes toward its own back surface is formed on a peripheral edge of the lens 17 so as to correspond to the reflector welding leg portion 106 of the reflector 101.

When the lens 107 is mounted on the reflector 101, as shown in FIG. 7B, a hot plate 113 is abutted against each tip end face of the lens welding leg portion 108 and the reflector welding leg portion 106, thus melting the tip end faces of the welding leg portions 108 and 106.

Next, as shown in FIG. 7C, each of the melted tip end faces of the lens welding leg portion 108 and reflector welding leg portion 106 are abutted and pressed together, thus heat welding the lens welding leg portion 108 to the reflector welding leg portion 106.

Figure 8A:
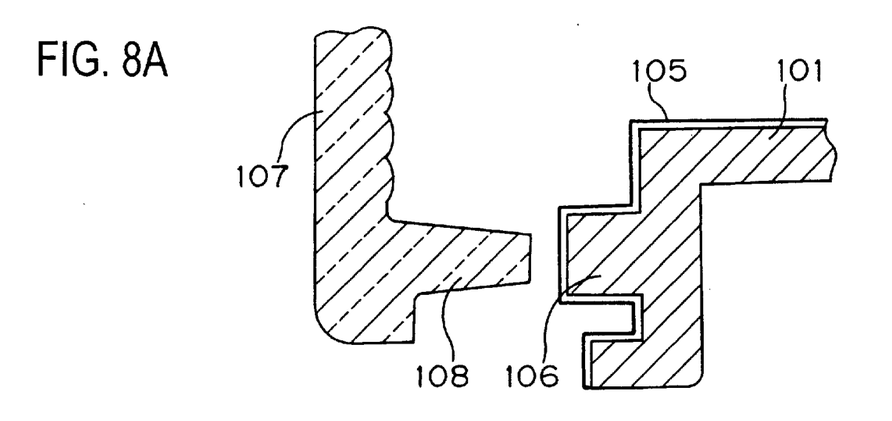
FIGS. 8A, 8B and 8C are schematic sectional diagrams showing the problems with a conventional welding method of a lens and a reflector.
Figure 8B:
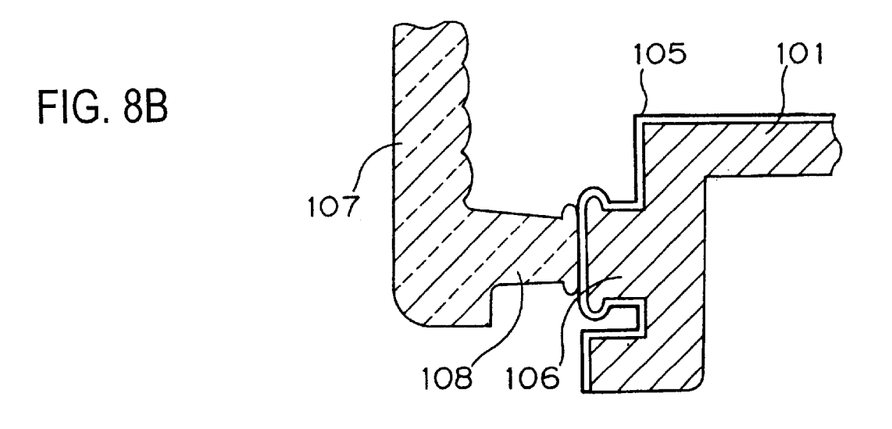
Figure 8C:
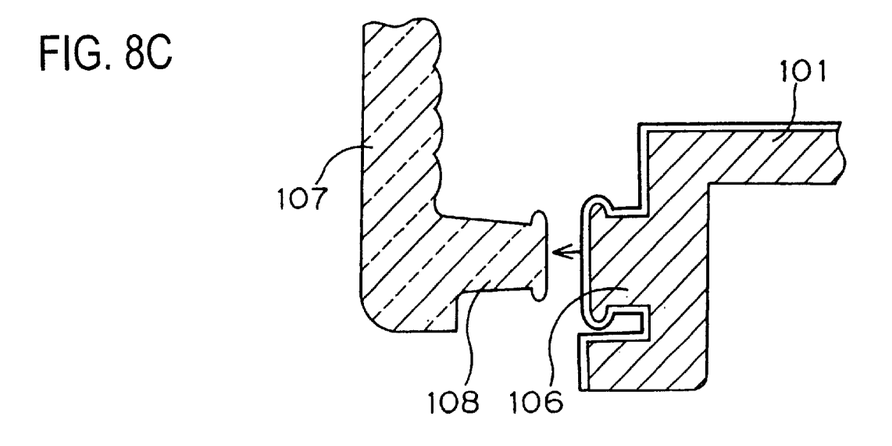

In some conventional lamp fixtures in which a lens and a reflector are welded in the manner as described above, the light reflecting film 105 is further formed on the tip end face of the reflector welding leg portion 106. FIG. 8A shows such a lamp fixture. In this lamp fixture, as shown in FIG. 8B, when the tip portion of the reflector welding leg portion 106 is melted and the reflector welding leg portion 106 and the lens welding leg portion 108 are welded, each of the resins of both welding leg portions 108 are 106 are not welded with a direct contact with each other. This occurs because the light reflecting film 105 remains between the abutting surfaces of the welding leg portions 108 and 106. As a result, the welding strength of both welding leg portions 108 and 106 is low, and the welded leg portions tend to easily be separated as shown in FIG. 8C.

Therefore, when forming the light reflecting film 105, it is important not to form the light reflecting film 105 on the tip end face of the reflector welding leg portion 106 as shown in FIG. 7A. For this reason, coating and vapor deposition are performed after putting a mask on the reflector welding leg portion 106 to cover it during the formation of the light reflecting film 105.

As seen from the above, in the conventional lamp fixture, the light reflecting film is formed in a complicated way, and the manufacturing costs thus tend to be high. Also, even when the light reflecting film is formed using a mask, coating material and vapor deposition film can flow under the mask through a gap between the mask and the reflector and adhere to the surface of the reflector welding leg portion. Thus, appropriate welding is not performed for this reason too.

In some cases, an aluminum film is formed as a light reflecting film by performing plating. In this case, a mask such as a resist is formed on the tip end face of the reflector welding leg portion. As a result, a process of peeling off of the resist film after the plating process is required. Thus, the process for forming the surface treatment film is complicated, causing high manufacturing costs.

SUMMARY OF THE INVENTION

Accordingly, it is an object of the present invention to provide a vehicle lamp fixture in which the assembling process is simple by reducing the number of production steps of a light reflecting film on a reflector, thus assuring low manufacturing costs.

It is another object of the present invention to provide a vehicle lamp fixture in which a lens and a reflector are welded securely to each other with a sufficient and appropriate strength.

The above objects are accomplished by a unique structure for a vehicle lamp fixture that comprises a thermoplastic resin reflector that has a light reflecting film formed on a surface and a thermoplastic resin lens that is welded to the reflector; and in the present invention, the reflector is provided with a reflector welding leg portion which has a convex cross section and to which the lens is welded to its tip end portion, and the tip end portion of the reflector welding leg portion is formed with an inclined surface which is inclined with respect to a direction in which the lens is welded.

In this structure, the light reflecting film includes a plasma polymerized film formed on the surface of the reflector. Also, the cross section of the inclined surface is, for instance, downwardly inclined from the central position toward both sides, respectively, in a width direction of the reflector welding leg portion, thus taking a triangular shape. In other words, the inclined surface has a V-shape or an angled letter C shape. Further, the angle of inclination of the inclined surface is preferably equal to or less than 60 degrees.

In the present invention, the inclined surface is formed on the tip portion of the reflector welding leg portion. In other words, an inclined surface having a triangular cross section is formed on the tip portion; and thus the tip portion is has an angled letter C shape surface.

Accordingly, when the tip portion of the reflector welding leg portion is heat melted by a hot plate, the light reflecting film automatically peels away while it changes its shape along the inclined surface, thus exposing the resin of the reflector welding leg portion on the tip portion. As a result, even when the lamp fixture body is entirely covered with a light reflecting film, it is possible to perform the welding of the lens and the reflector. It is thus also possible to obtain a lamp fixture that has an increased welding strength in the lens and the reflector and further to eliminate the need for a masking process that prevents the light reflecting film from forming on the tip portion of the reflector welding leg portion during the formation of the light reflecting film. The process for forming the light reflective film is simple, and the cost of the lamp fixture can be low.

DETAILE DESCRIPTION OF THE INVETNION

Embodiments of the present invention will be described below with reference to the accompanying drawings.

Figure 1:
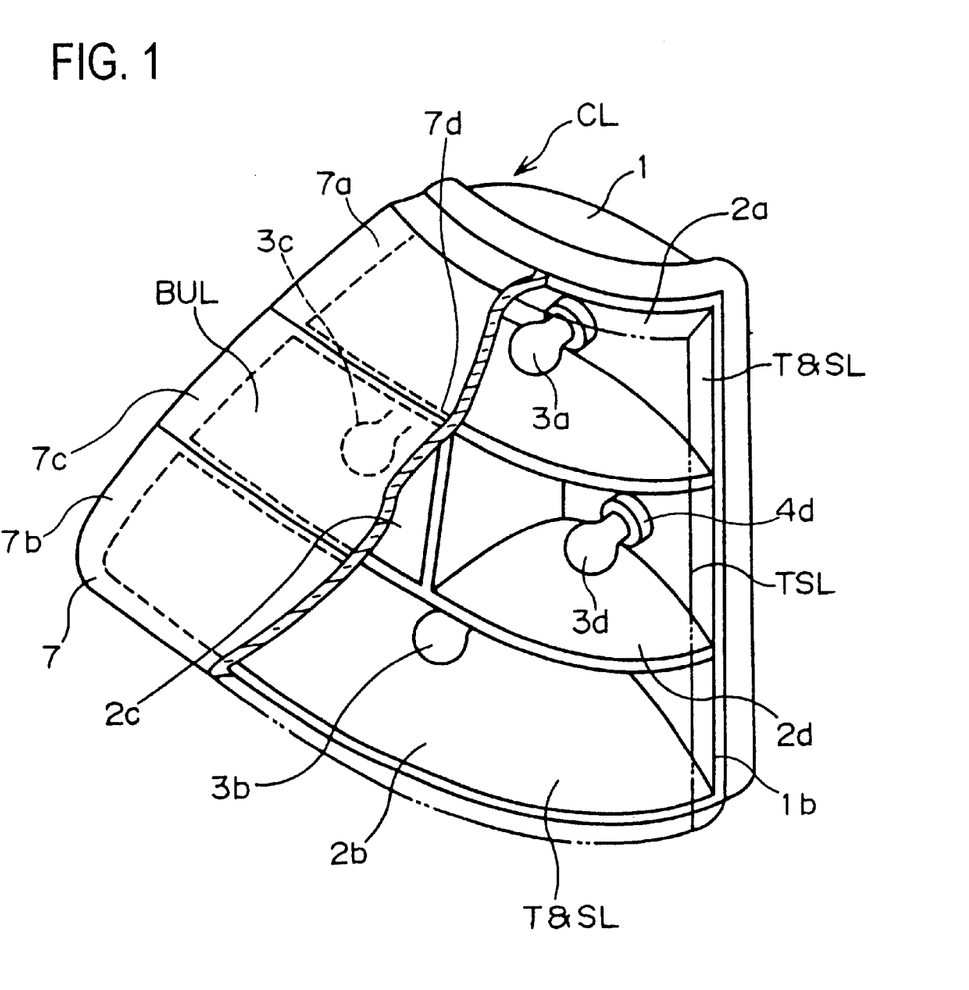
FIG. 1 is a partially section perspective view of a vehicle lamp fixture according to one embodiment of the present invention, the invention being applied to a composite type rear combination lamp.
Figure 2:
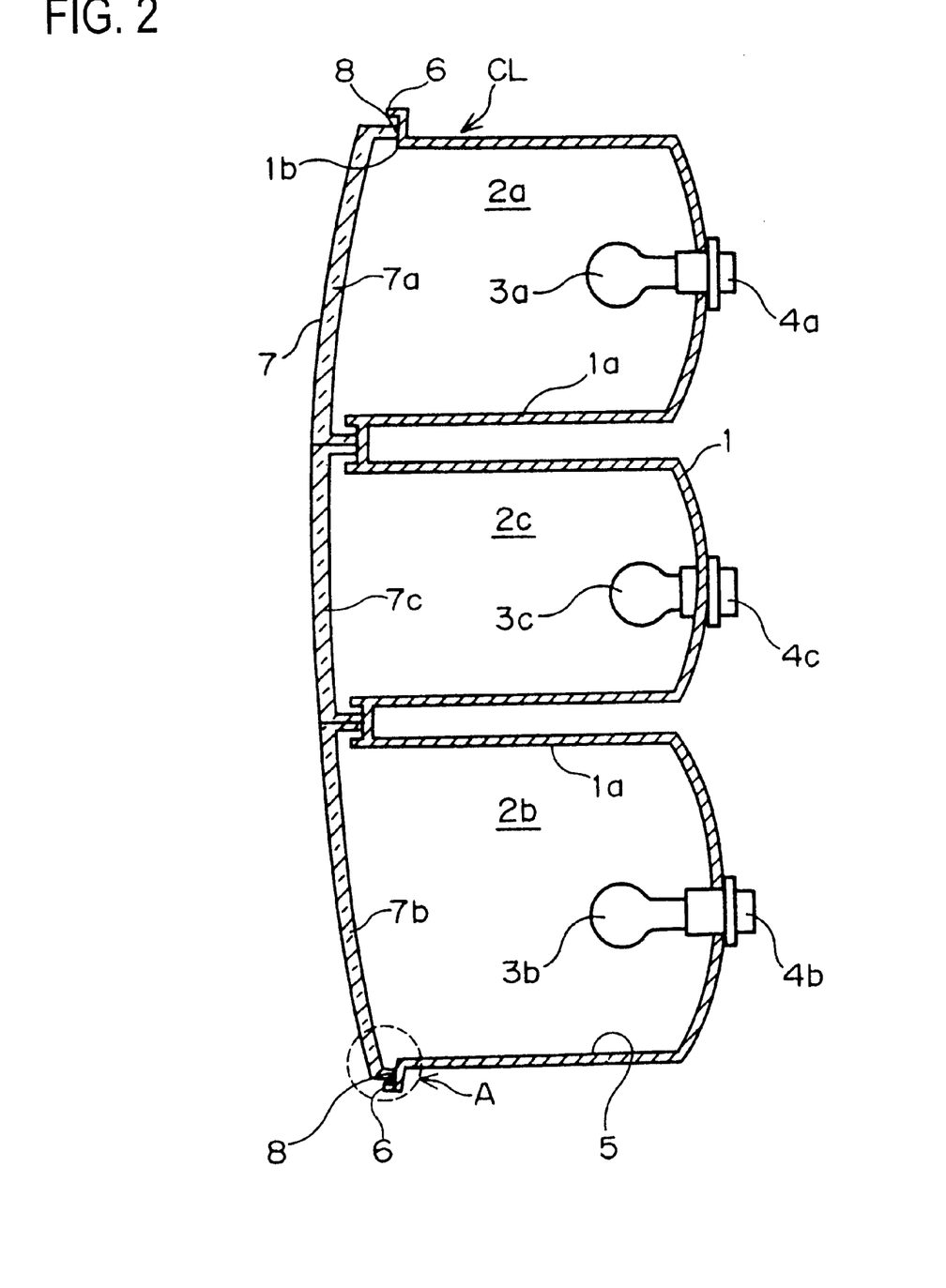
FIG. 2 is a longitudinal cross-sectional view of FIG. 1.

FIG. 1 shows an embodiment in which the present invention is applied to a tail lamp of a vehicle. The tail lamp here is a composite type lamp fixture CL and is a rear combination lamp, in which a tail and stop lamp, a backup lamp, and a turn signal lamp are integrated. FIG. 2 is a longitudinal sectional view thereof.

In this composite type lamp fixture CL, the lamp fixture body 1 is formed integrally by a thermoplastic resin, and its interior is divided into four lamp chambers 2a through 2d by a wall 1a. Bulbs (lamp bulbs) 3a through 3d are installed in lamp bulb sockets 4a through 4d that are respectively provided in each of the lamp chambers 2a through 2d, thus forming a tail & stop lamp T&SL, a backup lamp BUL, and a turn signal lamp TSL, respectively.

In the shown embodiment, the lamp fixture body 1 is divided into three levels: lower, middle and upper levels. The tail & stop lamps T&SL are installed on the top and lower level, respectively. The middle level is divided into a left side and a right side; and the backup lamp BUL is installed in one side, and the turn signal lamp TSL is installed in the other side.

A light reflecting film 5 (to be described below) is formed by surface finishing on the inner face of each one of the lamp chambers 2a through 2d of the lamp fixture body 1, so that the lamp fixture body 1 is formed as a reflector in the present invention. On an opening edge 1b of the front opening of the lamp fixture body 1, a reflector welding leg portion 6 is formed so that it extends along the opening edge 1b of the lamp fixture body 1. The reflector welding leg portion 6 has a convex cross section that protrudes toward the front of the lamp fixture body 1 as best seen from FIG. 2.

A lens 7 is fixed by welding at its peripheral edge to the front opening of the lamp fixture body 1, maintaining a liquid-sealed state in between. The lens 7 is made from a thermoplastic resin, and it comprises red lenses 7a and 7b that correspond to the tail & stop lamps T&SL, a white lens 7c that corresponds to the backup lamp BUL, and an amber lens 7d that corresponds to the turn signal lamp TSL. The red lenses 7a and 7b, the white lens 7c and the amber lens 7d are integrated and form the lens 7.

A lens welding leg portion 8 is formed on the peripheral edge of the lens 7. The lens welding leg portion 8 extends along the peripheral edge of the lens 7 and protrudes toward the lamp fixture body 1 as seen from FIG. 2. In other words, the lens welding leg portion 8 protrudes from the back surface edge of the lens 2. The lens welding leg portion 8 is abutted against and welded by thermo compression bonding to the tip end face of the reflector welding leg portion 6.

Figure 3A:
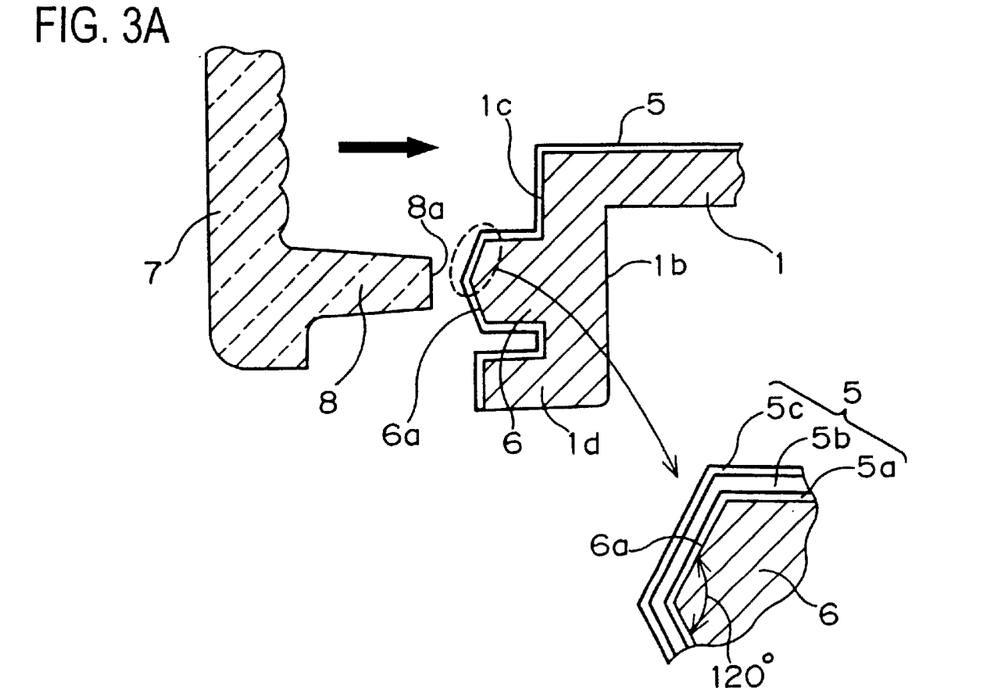
FIGS. 3A and 3B are enlarged sectional views of the portion A designated in FIG. 2.
Figure 3B:
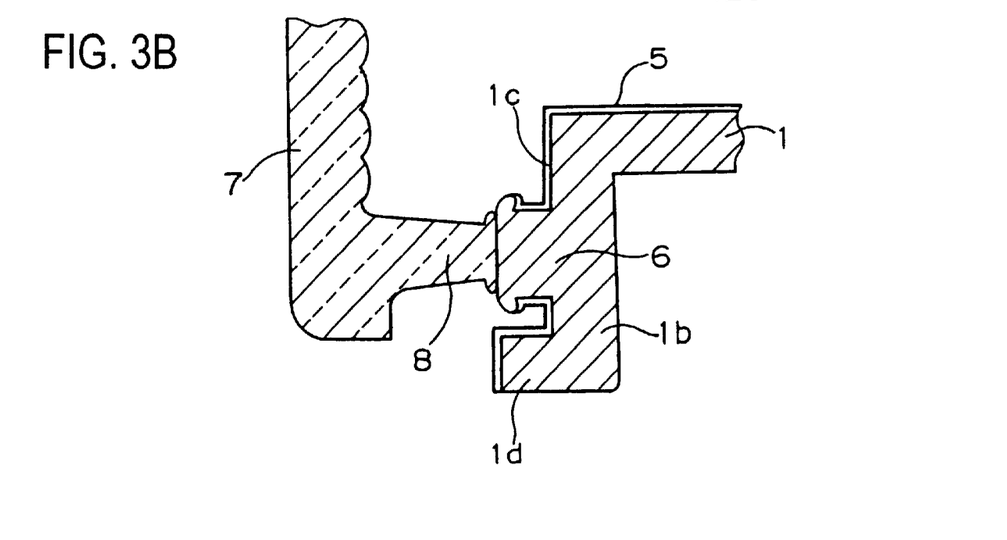

FIG. 3A shows the detail of the portion A shown in FIG. 2. In FIG. 3A, the lamp fixture body 1 and the lens 7 are not welded yet; and FIG. 3B shows the state after welding.

The reflector welding leg portion 6 of the lamp fixture body 1 is formed so as to extend along the peripheral of a flat front face 1c of the opening edge 1b of the lamp fixture body 1. The reflector welding leg portion 6 projects in a direction orthogonal to the direction in which the leg portion 6 extends along the peripheral of the opening edge 1b. In other words, the reflector welding leg portion 6 projects toward the front of the lamp fixture body 1 as best seen from FIG. 3A. The tip portion of the reflector welding leg portion 6 has an inclined surface 6a that inclines with respect to the direction in which the lens 7 is welded and which is shown by arrow. In other words, the tip portion of the reflector welding leg portion 6 is V-shaped as best seen from FIG. 3A with respect to the direction in which the reflector welding leg portion 6 protrudes.

In the shown embodiment, the inclined face 6a is formed in a triangular shape or the inclined surface 6a is in a letter V-shape or in the shape of angled letter C. In other words, the inclined surface 6a is formed as a downwardly inclined surface which descends from approximately the center towards both sides, respectively, in the width direction of the reflector welding leg portion 6. The apex angle of the inclined surface 6a is set to be approximately 120 degrees or to be an angle equal to or less than 120 degrees. On the other hand, the tip portion of the lens welding leg portion 8 of the lens 7 is formed flat, and this flat surface 8a is approximately perpendicular with respect to the direction of protrusion thereof.

It should be noted that a peripheral wall 1d, which protrudes forward to prevent deterioration of the appearance due to weld flash or the like generated during welding, is formed on the periphery of the flat front face 1c of the opening edge 1b of the lamp fixture body 1.

The light reflecting film 5 of each lamp chamber of the lamp fixture body 1 is, as best seen from FIG. 3A, has a laminated structure, and it is comprised of a silicone lower layer plasma polymerized film 5a, an aluminum vapor deposition film 5b, and a silicone upper layer plasma polymerized film 5c.

The silicone lower plasma polymerized film 5a and the lower layer plasma film 5c are formed by silicone monomer gas. More specifically, silicone monomer gas is supplied into a film forming chamber (not shown) into which the respective lamp fixture bodies are placed, and a high frequency electricity is applied to the gas, thus polymer-reacting the monomer gas by the generated plasma and depositing it on the inner surface of the lamp fixture body 1. The aluminum vapor deposition film 5b is obtained by way of vapor-depositing aluminum on the inner face of the lamp fixture body 1 by a sputter vapor deposition method in which aluminum is the target. In the shown embodiment, the thickness of each of the upper and lower plasma polymerized films 5a and 5c is approximately 20 nm, and the thickness of the aluminum vapor deposition film 5b is approximately 100 nm.

Thus, when forming the light reflecting film 5, a masking process that is performed for preventing a film from forming on the tip end inclined surface 6a of the reflector welding leg portion 6 is not employed. The light reflecting film 5 is formed on the entire surface of the inside of the lamp fixture body 1 without the masking process, so that the tip end inclined surface 6a of the reflector welding leg portion 6 is covered by the light reflecting film 5.

The method for welding the lens 7 to the lamp fixture body 1 formed as described above will be described with reference to FIGS. 4A through 4C.

Figure 4A:
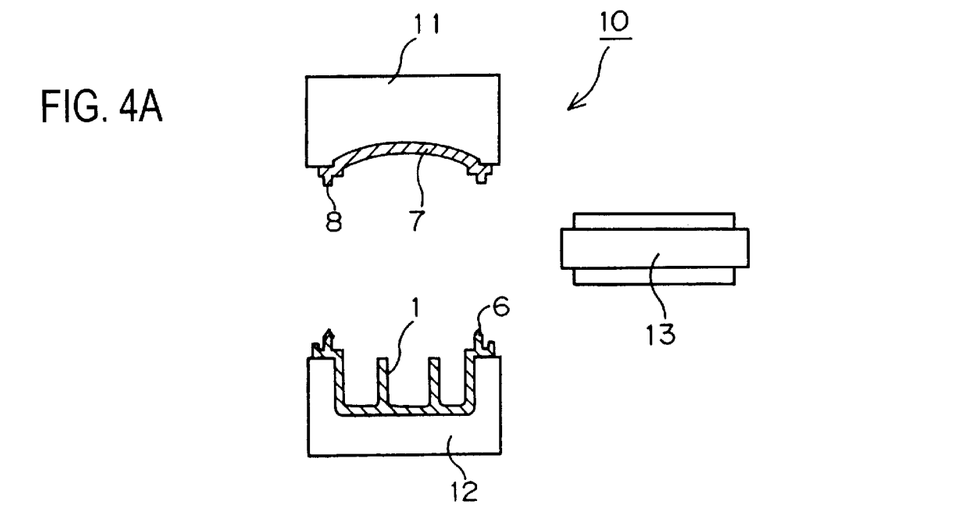
FIGS. 4A, 4B and 4C show the typical steps of welding a lens to a lamp body (or a reflector) in the present invention.

First, as shown in FIG. 4A, an upper die 11 and a lower die 12 which move relatively up and down, and a hot plate 13 that is able to advance and retreat between the upper and lower dies 11 and 12 are provided in a welding apparatus 10. The lens is held in the upper die 11 with its lens welding leg portion 8 facing downward; and in the lower die 12, the lamp fixture body 1 is held with its reflector welding leg portion 6 facing upward.

Figure 4B:
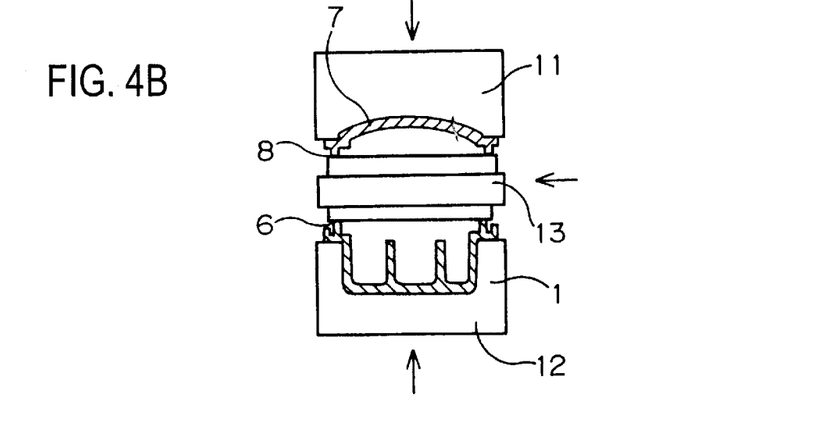

Next, as seen from FIG. 4B, the heated hot plate 13 is moved to a position between the upper die 11 and the lower die 12, and the upper die 11 is moved down and the lower die 12 is moved up. Thus, the tip portion of the lens welding leg portion 8 of the lens 7 and the tip portion of the reflector welding leg portion 6 of the lamp fixture body 1 are respectively pressed to the hot plate 13. As a result, each of the tip portions of the lens welding leg portion 8 and the reflector welding leg portion 6 are melted.

Figure 4C:
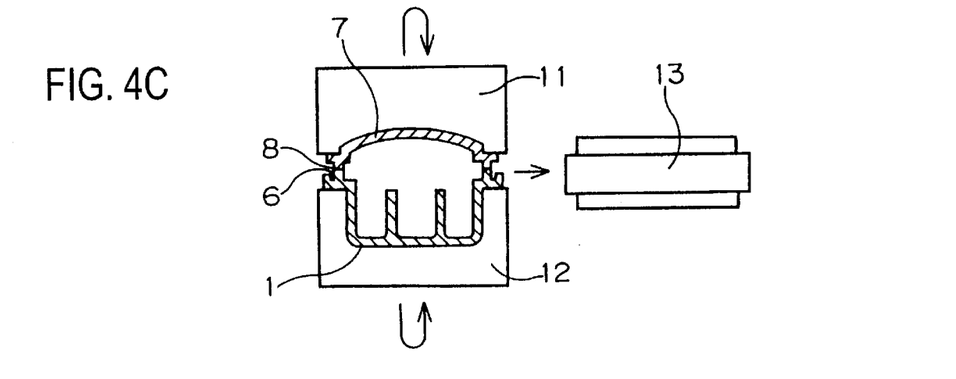

Next, as shown in FIG. 4C, the hot plate 13 is moved away from the upper and lower dies 11 and 12. Then, the upper die 11 is moved down, and the lower die 12 is moved up, so that each of the tip portions of the lens welding leg portion 8 and the reflector welding leg portion 6 are pressed against each other. After the pressing, they are cooled in that state. As a result, the lens welding leg portion 8 and the reflector welding leg portion 6 which have both been melted are welded together, and the lens 7 is weld-mounted to the opening edge 1a of the lamp fixture body 1.

Figure 5A:
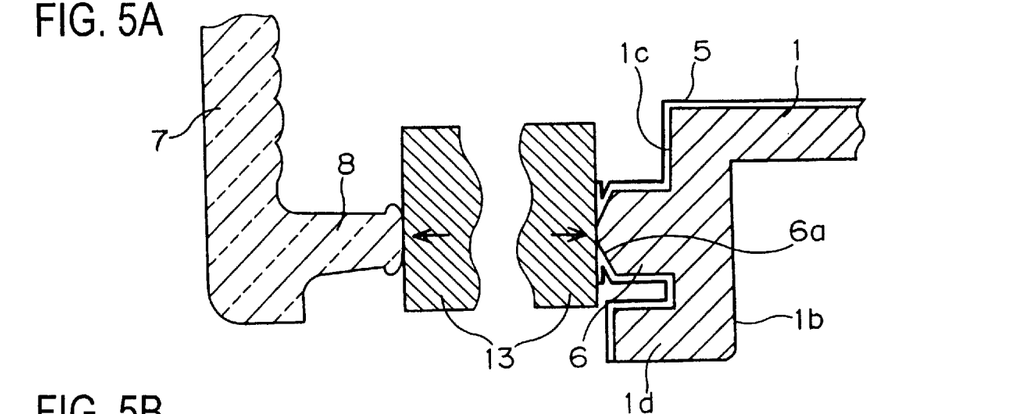
FIGS. 5A, 5B and 5C are schematic sectional views showing the steps of welding a reflector welding leg portion and a lens welding leg portion together.
Figure 5B:
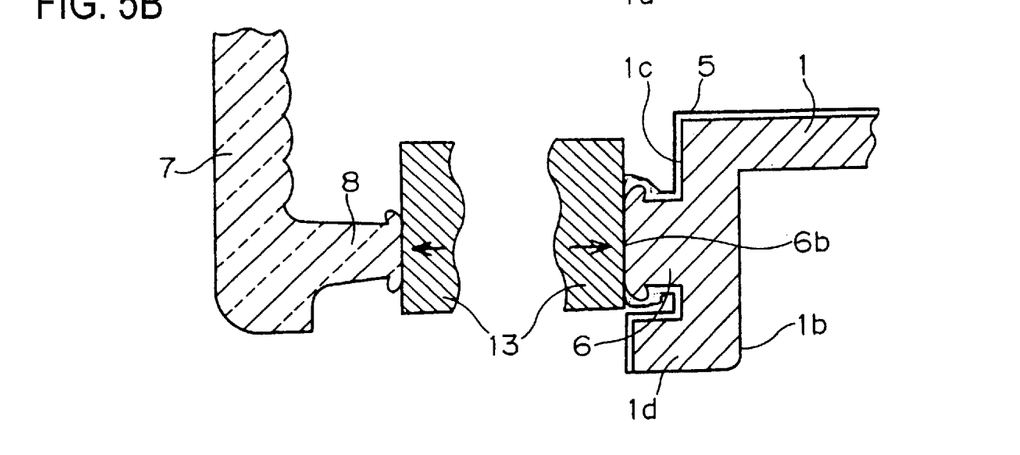
Figure 5C:
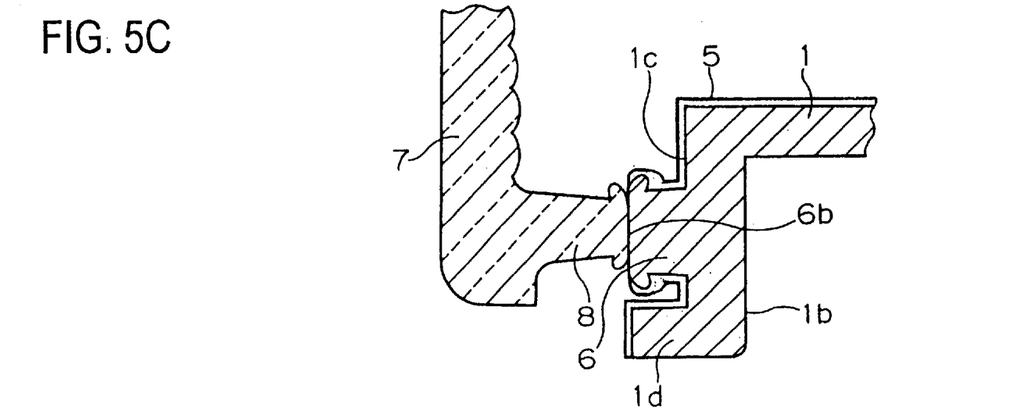

FIGS. 5A through 5C show the welding states at the lens welding leg portion 8 and the reflector welding leg portion 6 in the welding steps shown in FIGS. 4B and 4C.

As described above, the reflector welding leg portion 6 of the lamp fixture body 1 is covered with the light reflecting film 5, and this light reflecting film 5 is also formed on the inclined surface 6a of the tip portion which has a triangular cross section or an angled letter C-shape cross section. When the hot plate 13 is pressed to the tip portion of the reflector welding leg portion 6 as shown in FIG. 4B, the tip portion is, as shown in FIG. 5A, abutted against the surface of the flat hot plate 13 and gradually changes its shape so that it becomes resemble to the flat surface of the hot plate 13 by the pressure that is applied thereby as shown by an arrow in FIG. 5A during pressing while being heated and melted by the hot plate 13.

Because the tip portion of the reflector welding leg portion 6 thus gradually changes its shape from the tip portion of the inclined surface 6a toward its both sides as melting progresses, the light reflecting film 5 on the surface of the inclined surface 6a is pushed out toward both sides by this change and gradually peels away from the surface of the inclined surface 6a. In particular, in the shown embodiment, the light reflecting film 5 is comprised of the silicone plasma polymerized films 5a and 5c and of the aluminum vapor deposition film 5b. Accordingly, the peeling away of the light reflecting film 5 progresses relatively easy.

In the state shown in FIG. 5B in which the melting and change of shape of the tip portion by the hot plate 13 has progressed, the tip portion of the reflector welding leg portion 6 is changed into a flat surface 6b that resembles the flat surface of the hot plate 13. Also, the light reflecting film 5 shifts to positions on both sides of the reflector welding leg portion 6, and most of it is removed. As a result, the light reflecting film 5 is not on the formed flat face 6b, and the resin that constitutes the lamp fixture body 1 is exposed.

Then, the tip portion of the lens welding leg portion 8 that has been melted in the same way as in the reflector welding leg portion 6 by the hot plate 13 is pressed against the thus formed flat surface 6b as shown in FIG. 5C. As a result, an appropriate welding is performed, and the reflector welding leg portion 6 and the lens welding leg portion 8 are welded together with an increased welding strength.

The inventors fabricated a prototype of the lamp fixture according to the present invention. The prototype indicates that if the angle with respect to the direction in which the lens 7 is brought to and welded to the inclined surface 6a of the tip portion of the reflector welding leg portion 6 (as shown by arrow in FIG. 3A) is approximately 60 degrees, then a proper welding is obtained. In other words, if, as best seen from FIG. 3A, the apex angle of the inclined surface 6a is set to be approximately 120 degrees, then it is possible to peel off the light reflecting film 5 in such a range that the amount of shape change of the tip portion of the reflector welding leg portion 6 due to the pressure of the hot plate 13 will not become unnecessarily large.

More specifically, if the angle of the inclined surface 6a is greater than 60 and thus the apex angle is greater than 120 degrees, then the peeling efficiency of the light reflecting film 5 diminishes, and it becomes difficult to expect appropriate welding. If the angle of the inclined surface 6a is equal to or less than 60 degrees and thus the apex angle is equal to or less than 120 degrees, then a sufficient peeling effect of the light reflecting film 5 is obtained, which is sufficient for accomplishing the object of the present invention. However, if the angle or apex angle is too small and the reflector welding leg portion 6 is sharply pointed, then the height dimension (that is a lateral length in FIG. 3A) in the tip portion of the reflector welding leg portion 6 decreases significantly when the tip portion is heated by the hot plate 13; and it becomes difficult to ensure the design dimensions of the outside dimensions of the lamp fixture when the lens 7 is welded.

As seen from the above, in the present invention, the tip portion of the reflector welding leg portion 6 has the inclined surface 6a that has a triangular cross section. Accordingly, it is possible to automatically peel away the light reflecting film 5 of the tip portion of the reflector welding leg portion 6 by the hot plate so as to have the resin exposed when welding the lens welding leg portion 8. Thus, a light reflecting film on the entire surface of the inner face of the lamp fixture body when forming the light reflecting film on the lamp chamber of the lamp fixture body 1 will not cause any difficulty or problems when mounting the lens 7 on the lamp fixture body 1. It is also possible to use a method for forming a plasma polymerized film and an aluminum vapor deposition film with sputter vapor deposition without using a masking process that is for avoiding the light reflecting film from forming on the tip portion of the reflector welding leg portion. Accordingly, the process for forming the light reflecting film 5 can be simplified, realizing a cost reduction.

In the above described embodiment, the cross sectional shape of the tip portion of the reflector welding leg portion 6 is triangle (or an angled letter C or a V-shape) so that two flat surfaces that make the inclined surface 6a are evenly arranged at about 120 degrees as seen from FIG. 3A. However, other structures or shapes can be employed as long as the hot plate is allowed to be pressed against the tip portion of the reflector welding leg portion and to change the shape of the tip portion, thus causing the light reflecting film to be removed from the tip end of the reflector welding leg portion.

Accordingly, the tip portion of the reflector welding leg portion 6 can take such shapes as shown in FIGS. 6A through 6D.

Figure 6A:
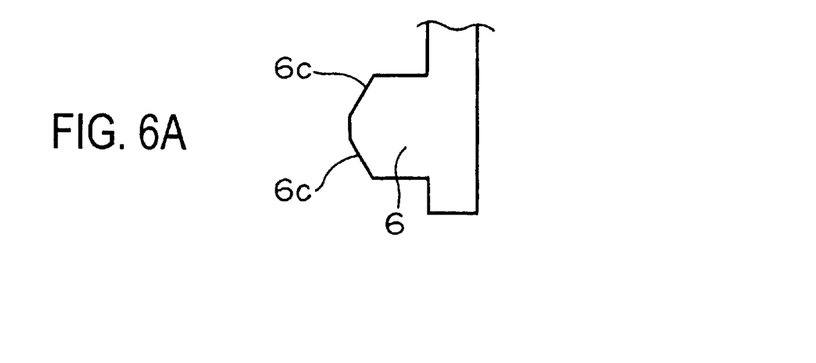
FIGS. 6A, 6B, 6C and 6D are cross-sectional diagrams of the various shapes of the tip portions of the reflector welding leg portions according to the present invention.
Figure 6B:
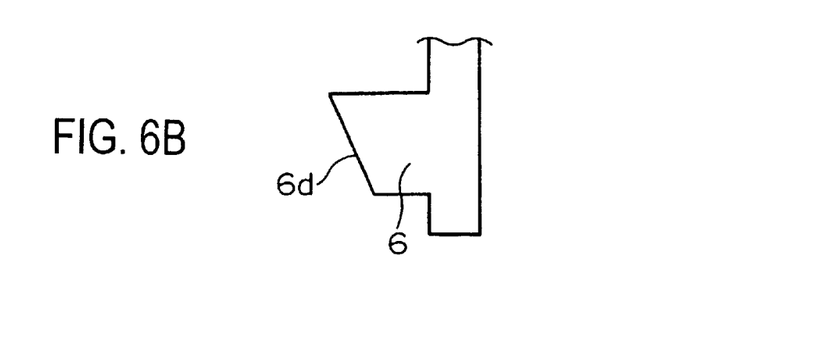
Figure 6C:
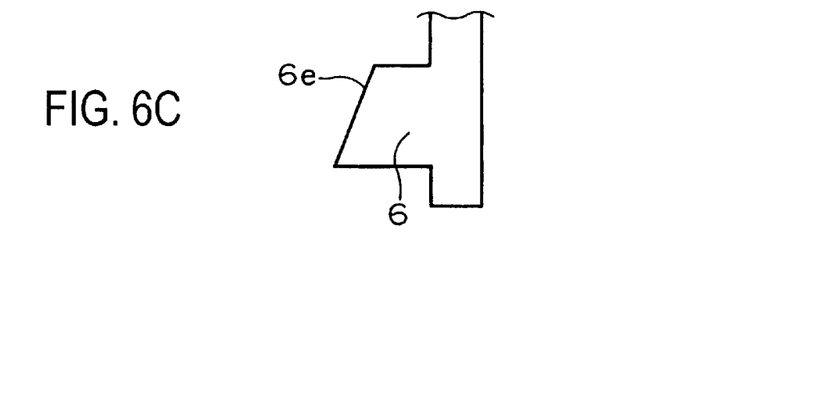
Figure 6D:
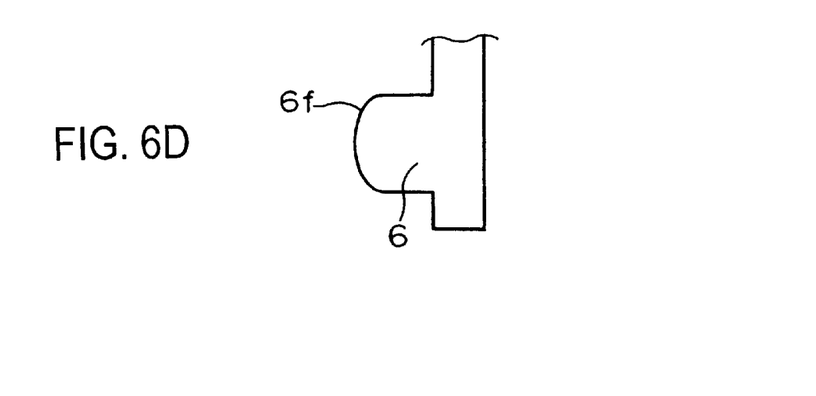

In FIG. 6A, the tip portion is trapezoidal. In other words, the center portion is flat, and two inclined surfaces 6c are provided on both sides of the flat center portion. In FIGS. 6B and 6C, the tip portion has a single inclined surface 6d or 6e. In FIG. 6B, the inclined surface 6d inclines towards the outside of the lamp fixture body. In FIG. 6E, the inclined surface 6e inclines towards the inside of the lamp fixture body. In FIG. 6D, the tip portion is arc-shaped so that the angle of inclination of the inclined surface gradually changes.

As in the above-described embodiment, in the case of the inclined surfaces 6c shown in FIG. 6A, it is preferable that the virtual apex angle be equal to or less than 120 degrees. Also, in the inclined surfaces 6d and 6e shown in FIGS. 6B and 6C, it is preferable that the angle of the inclined surface with respect to the direction of welding of the lens (or the direction in which the lens welding leg portion 8 is moved towards the reflector welding leg portion 6) be equal to or less than 60 degrees.

In the above embodiments, the light reflecting film is comprised of the silicone plasma polymerized films for lower and upper layers and of the aluminum vapor deposition film for the intermediate layer. However, as long as the light reflecting film deforms and is easily peeled away when heat and pressure are applied to the tip portion of the reflector welding leg portion, structures other than those in the above embodiments can be employed.

The above embodiments are described with reference to a composite type lamp. However, the present invention is of course applicable in the same way to a lamp of a single structure or a composite type lamp made of a combination of other different lamps as long as its structure comprises a lens mounted on a lamp fixture body, that is, a reflector by welding.

As seen from the above, in the lamp fixture of the present invention, a reflector that is made of a thermoplastic resin and formed with a light reflecting film on its surface is provided with a reflector welding leg portion, this reflector welding leg portion to which a lens is to be welded is a protruded element, and the tip portion of the reflector welding leg portion has an inclined surface which inclines with respect to the direction in which the lens is welded.

Accordingly, when the tip portion of the reflector welding leg portion is heat-melted, the light reflecting film formed on the surface of the tip portion is automatically peeled off, thus exposing the resin (which is the material of the reflector) to be exposed. As a result, even when the light reflecting film is formed on the entire surface of the lamp fixture body, it is possible to weld the lens to the reflector and to increase the welding strength while eliminating the masking process upon forming the light reflecting film, thereby making the film forming process of the light reflecting film simple and the cost of the lamp fixture reduced.

What is claimed is:

1. A vehicle lamp fixture comprising a thermoplastic resin reflector that has a light reflecting film formed on a surface thereof and a thermoplastic resin lens welded to said reflector, wherein:

said lens is provided with a lens welding leg portion that protrudes from a back surface edge of said lens;

said reflector is provided with a reflector welding leg portion that projects from a front edge of said reflector so that a tip portion of said lens welding leg portion is welded to a tip portion of said reflector welding leg portion;

said tip portion of said reflector welding leg portion has an inclined surface which is inclined with respect to a direction in which said lens is welded;

said tip inclined surface of said reflector welding leg portion is covered by the reflecting film;

said lens welding leg portion and said reflector welding leg portion are both welded together by melting; and said lens is weld-mounted to said reflector.

2. The vehicle lamp fixture according to claim 1, wherein said light reflecting film includes a plasma polymerized film formed on a surface of said reflector.

3. A vehicle lamp fixture according to claim 2, wherein said inclined face is such that a cross section thereof which is downwardly inclined from a central position toward both sides, respectively, in a width direction of said reflector welding leg portion is in a triangular shape.

4. A vehicle lamp fixture according to claim 3, wherein said inclined surface has an angle of inclination which is equal to or less than 60 degrees with respect to a center of said letter V shape.

5. A vehicle lamp fixture according to claim 2, wherein said inclined surface has an angle of inclination which is equal to or less than 60 degrees with respect to a direction in which said lens is welded.

6. A vehicle lamp fixture according to claim 1, wherein said inclined face is such that a cross section thereof which is downwardly inclined from a central position toward both sides, respectively, in a width direction of said reflector welding leg portion is in a triangular shape.

7. A vehicle lamp fixture according to claim 6, wherein said inclined surface has an angle of inclination which is equal to or less than 60 degrees with respect to a center of said letter V shape.

8. A vehicle lamp fixture according to claim 1, wherein said inclined surface has an angle of inclination which is equal to or less than 60 degrees with respect to a direction in which said lens is welded.

* * * * *